United States Patent

Stewart

[11] Patent Number: 5,993,063
[45] Date of Patent: Nov. 30, 1999

[54] SKID PLATE FOR INSTALLATION ON A BOAT TRAILER BUNK

[76] Inventor: James B. Stewart, P.O. Box 1568, Lake Oswego, Oreg. 97035

[21] Appl. No.: 09/102,115

[22] Filed: Jun. 22, 1998

[51] Int. Cl.[6] .............................. F16C 29/02; B60P 3/10
[52] U.S. Cl. ....................... 384/42; 280/414.1; 414/482
[58] Field of Search .............................. 384/42; 414/482, 414/483; 280/414.1, 414.3

[56] References Cited

U.S. PATENT DOCUMENTS

| | | | |
|---|---|---|---|
| 4,105,219 | 8/1978 | Gerson | 280/414.1 X |
| 4,429,893 | 2/1984 | Palamara | 280/414.1 |
| 4,519,738 | 5/1985 | Wood | 280/475 |
| 5,133,570 | 7/1992 | Godbersen | 280/414.1 |
| 5,192,189 | 3/1993 | Murata et al. | 384/42 X |
| 5,429,383 | 7/1995 | Reed | 280/414.1 |
| 5,560,713 | 10/1996 | Christenson | 384/42 |

*Primary Examiner*—Thomas R. Hannon
*Attorney, Agent, or Firm*—James D. Givnan, Jr.

[57] ABSTRACT

A skid plate for mounting on the end of a boat trailer and bunk includes a lip which depends from the main body of the plate for abutment with the rearward end of the bunk to protect the bunk and the hull of the boat being loaded onto or off of the trailer. The skid plates include an inclined forward portion to facilitate boat hull passage over the plate.

2 Claims, 1 Drawing Sheet

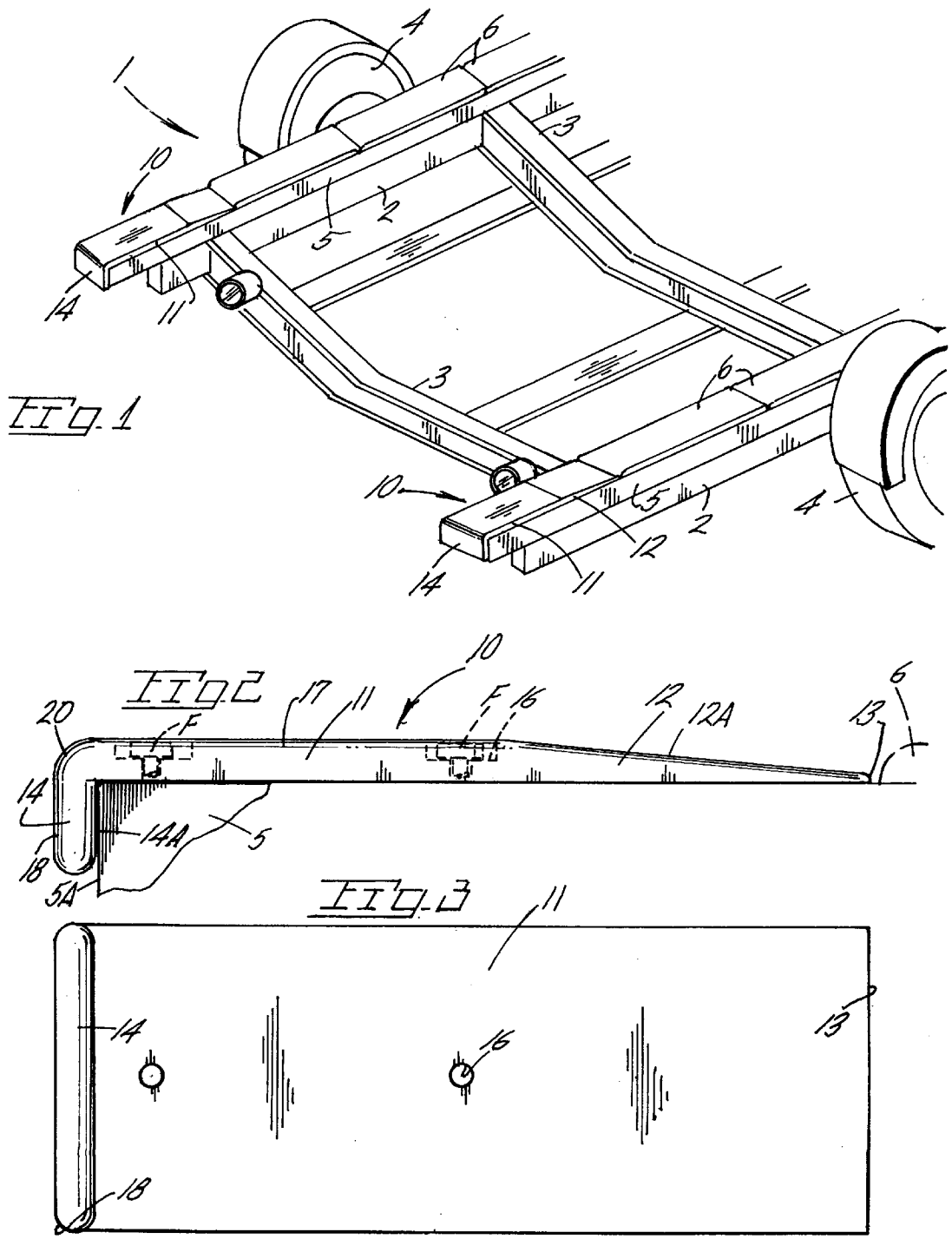

SKID PLATE FOR INSTALLATION ON A BOAT TRAILER BUNK

BACKGROUND OF THE INVENTION

The present invention concerns generally trailers for small boats which are loaded and unloaded from the rear end of the trailer.

Small boat trailers often include lengthwise extending bunks on which a boat is slid into place for travel and conversely, slid into the water during a launching operation. Boat trailer bunks often are provided with resilient material to protect the boat hull from being marred by the trailer bunk. The loading and launching of a boat from a trailer subjects the trailer bunks to considerable wear. To alleviate such wear, high density synthetic material with a low coefficient of friction have been utilized on the trailer bunks. Accordingly both loading of a boat onto a boat trailer as well as launching of a boat from a boat trailer is greatly facilitated.

A problem occurs when the boat being loaded initially contacts the ends or end of a bunk. Any material thereon is subjected to loads imparted by the boat hull. A further problem encountered by boat owners in the loading of a small boat on a trailer is the task of aligning the center line of the boat with that of the trailer during retrieving or loading of the boat onto the trailer. Lateral displacement of the boat hull during such alignment is oftime difficult by reason of the hull being in contact with a bunk end from which it must be displaced inwardly toward the trailer center line prior to further loading effort. In the prior art plates of high density material for attachment to a bunk which facilitates travel of the boat hull lengthwise of the trailer. U.S. Pat. No. 5,429,383 discloses such plates in place on a boat trailer.

U.S. Pat. No. 4,519,738 discloses a boat trailer having a tiltable bunk provided with rollers at each end of the bunk to facilitate loading and unloading of a boat hull.

SUMMARY OF THE PRESENT INVENTION

The present invention is embodied within a plate for endwise securement to a trailer bunk with provision made for a plate lip to engage an upright surface of the bunk to contribute to plate retention regardless of loads imparted by a boat hull as well as protect the bunk from such contact.

The present bunk plate may be termed an end skid plate in that it is intended for installation on the rearwardmost end of a trailer bunk. The remaining surfaces of each trailer bunk may be equipped with plates of low friction material. A lip on the present skid plate is integral with a main body of the plate and is adapted to abut a bunk end to bear loads imparted by a boat hull which otherwise would damage the bunk. The present skid plate is also adapted for the reception of fasteners securing the plate to the end segment of a bunk. The plate is provided with radiused corners to avoid marring of a boat hull particularly during that time when the hull is being aligned with the trailer centerline during loading.

Important objectives include the provision of an end plate of high density synthetic material having a low coefficient of friction, having surfaces for contact with the top and end surfaces of a boat trailer bunk to resist displacement by contact of a boat hull; the provision of an end plate for a boat bunk which has relatively large radiused edges to avoid marring of a wood or plastic boat hull; the provision of an end plate for a trailer bunk which contributes to the ease of shifting a boat hull laterally into alignment with a boat trailer centerline during a loading operation.

BRIEF DESCRIPTION OF THE DRAWINGS

In the accompanying drawings:

FIG. 1 is a perspective view of a portion of a boat trailer equipped with the present bunk end skid plates;

FIG. 2 is a side elevational view of the present bunk end skid plate with a fragment of the trailer bunk shown;

FIG. 3 is a bottom plan view of the present end skid plate shown in FIG. 2 with the bunk fragment removed.

DETAILED DESCRIPTION OF THE PREFERRED EMBODIMENTS

With continuing attention to the drawings wherein applied reference numerals indicate parts similarly hereinafter identified, the reference numeral 1 indicates the rearward portion of a boat trailer of the type for transporting small boats for launching and retrieving same at launching ramps. Such trailers include lengthwise extending frame members 2 joined by cross members 3. Trailer wheels are at 4. Typically such trailers include a bunk structure comprising bunks 5 which may be supported on frame members 2 or elevated somewhat therefrom and often provided with fabric or resilient material to protect the boat hull. High density synthetic material plates at 6 ease sliding of the boat hull along each bunk. One type of such plates are those manufactured from high density polyethylene.

Indicated generally at 10 are bunk end skid plates each mounted at the rearward end of a bunk 5 which serve to facilitate loading and unloading of a boat (not shown) as well as protect the bunk from damage from forceful contact with a boat hull during loading of a boat. Each end skid plate 10 includes a main body 11 preferably having a tapered forward portion 12 terminating at an end 13. At the rearward end of bunk plate 10 is a lip 14 integral with the main body for abutment with the rearward end 5A of bunk 5. A lip surface 14A is held in abutment with bunk end 5A by fastener elements F, the heads of which are seated within countersunk openings 16 in the bunk plate main body. Main body 11 terminates at its lengthwise edges 17 in radiused surfaces while lip 14 is similarly radiused at 18 to ensure contact with a boat hull does not damage the latter. A corner of the end plate is similarly radiused at 20.

Lip 14 additionally serves to prevent forward displacement of skid plate 10 during the initial portion of a loading operation whereat a substantial portion of the boat's weight is initially supported by the pair of end skid plates 10.

Forward portion 12 is preferably provided with an inclined surface 12A to minimize the height of end 13 to reduce resistance to passage of a contacting hull surface when additional skid plates 5 are not used on a bunk.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A skid plate for installation on the rearward end of a bunk of a boat trailer, said skid plate comprising, an elongate main body of high density plastic, means for attaching the main body to the bunk, and a lip depending from one end of said main body for abutment with the bunk end to prevent skid plate displacement and damage to the bunk upon contact with a boat hull during loading of the trailer.

2. The skid plate claimed in claim 1 wherein said main body includes an upper surface and a forward portion having a surface inclined to the upper surface of the main body.

* * * * *